(12) United States Patent
Kim et al.

(10) Patent No.: US 10,235,261 B2
(45) Date of Patent: Mar. 19, 2019

(54) APPARATUS AND METHOD FOR TESTING RANDOMNESS

(71) Applicant: ICTK Holdings Co., Ltd., Seongnam-si (KR)

(72) Inventors: Dong Kyue Kim, Seoul (KR); Byong Deok Choi, Seoul (KR); Kwang Hyun Jee, Gyeonggi-do (KR)

(73) Assignee: ICTK Holdings Co., Ltd., Seongnam-si (KR)

( * ) Notice: Subject to any disclaimer, the term of this patent is extended or adjusted under 35 U.S.C. 154(b) by 215 days.

(21) Appl. No.: 14/907,801

(22) PCT Filed: Jul. 28, 2014

(86) PCT No.: PCT/KR2014/006897
§ 371 (c)(1),
(2) Date: Jan. 26, 2016

(87) PCT Pub. No.: WO2015/012667
PCT Pub. Date: Jan. 29, 2015

(65) Prior Publication Data
US 2016/0170856 A1 Jun. 16, 2016

(30) Foreign Application Priority Data
Jul. 26, 2013 (KR) .................. 10-2013-0088696

(51) Int. Cl.
*G06F 11/273* (2006.01)
*G09C 1/00* (2006.01)
(Continued)

(52) U.S. Cl.
CPC ........ *G06F 11/273* (2013.01); *G06F 11/2205* (2013.01); *G09C 1/00* (2013.01);
(Continued)

(58) Field of Classification Search
CPC combination set(s) only.
See application file for complete search history.

(56) References Cited

U.S. PATENT DOCUMENTS 8,427,193 B1 4/2013 Trimberger
2004/0103131 A1 5/2004 Henry et al.
(Continued)

FOREIGN PATENT DOCUMENTS

KR 1020090055994 A 6/2009
KR 100926214 B1 11/2009
(Continued)

OTHER PUBLICATIONS

ISA Korean Intellectual Property Office, International Search Report Issued in Application No. PCT/KR2014/006897, dated Nov. 18, 2014, WIPO, 6 pages.
(Continued)

*Primary Examiner* — Mamadou Diallo
(74) *Attorney, Agent, or Firm* — McCoy Russell LLP

(57) ABSTRACT

A randomness testing apparatus is disclosed. A randomness testing apparatus according to an embodiment includes a randomness testing module to conduct a randomness test on physically unclonable function (PUF)-based hardware and a processing device to determine whether the PUF-based hardware is defective on the basis of a randomness test result.

20 Claims, 11 Drawing Sheets

(51) Int. Cl.
  *H03K 23/00* (2006.01)
  *H04L 9/06* (2006.01)
  *H04L 9/08* (2006.01)
  *G06F 11/22* (2006.01)

(52) U.S. Cl.
  CPC ......... *H03K 23/004* (2013.01); *H04L 9/0656* (2013.01); *H04L 9/0866* (2013.01); *H04L 2209/26* (2013.01)

(56) References Cited

U.S. PATENT DOCUMENTS

| | | | |
|---|---|---|---|
| 2006/0040731 | A1 | 2/2006 | Yamamoto et al. |
| 2009/0106615 | A1 | 4/2009 | Nakakita |
| 2009/0132624 | A1* | 5/2009 | Haselsteiner ........... G06F 7/588 708/255 |
| 2011/0055649 | A1 | 3/2011 | Koushanfar et al. |
| 2011/0066670 | A1 | 3/2011 | Yu |
| 2011/0096955 | A1* | 4/2011 | Voloshynovskiy ...... G06K 9/00 382/103 |
| 2012/0328773 | A1* | 12/2012 | Duerig ................... B82Y 30/00 427/58 |
| 2013/0101114 | A1* | 4/2013 | Kim ......................... G06F 21/73 380/44 |
| 2013/0108145 | A1* | 5/2013 | Cobb ..................... G06T 1/0021 382/141 |
| 2013/0243187 | A1* | 9/2013 | Horstmeyer .............. H04L 9/28 380/28 |
| 2013/0322624 | A1* | 12/2013 | Kim ......................... H04L 9/002 380/44 |
| 2014/0035624 | A1* | 2/2014 | Kuenemund .......... H03K 17/30 327/77 |
| 2014/0111234 | A1* | 4/2014 | Laackmann ..... G01R 31/31719 324/750.3 |
| 2014/0170983 | A1* | 6/2014 | Leveille ................ H04W 24/00 455/67.11 |
| 2014/0376717 | A1* | 12/2014 | Macchetti ................ H04L 9/14 380/28 |
| 2018/0122567 | A1* | 5/2018 | Hall ........................ H01F 38/14 |

FOREIGN PATENT DOCUMENTS

| | | |
|---|---|---|
| KR | 100937516 B1 | 1/2010 |
| KR | 100980052 B1 | 9/2010 |
| KR | 101080511 B1 | 11/2011 |
| KR | 101080529 B1 | 11/2011 |
| KR | 101118826 B1 | 4/2012 |
| KR | 101139630 B1 | 5/2012 |
| KR | 101169172 B1 | 8/2012 |
| KR | 1020120089607 A | 8/2012 |
| KR | 1020120112246 A | 10/2012 |
| KR | 1020130019358 A | 2/2013 |
| KR | 101332517 B1 | 11/2013 |
| KR | 101442401 B1 | 9/2014 |
| KR | 1020140115278 A | 9/2014 |
| KR | 101457305 B1 | 11/2014 |
| KR | 1020140126787 A | 11/2014 |
| KR | 101488616 B1 | 2/2015 |
| KR | 101489088 B1 | 2/2015 |
| KR | 101489091 B1 | 2/2015 |
| KR | 101495448 B1 | 2/2015 |
| KR | 1020150024676 A | 3/2015 |
| KR | 1020150026478 A | 3/2015 |
| KR | 1020150028540 A | 3/2015 |
| KR | 1020150032606 A | 3/2015 |
| KR | 1020150078801 A | 7/2015 |
| KR | 1020150078817 A | 7/2015 |

OTHER PUBLICATIONS

Rukhin, A. et al., "A Statistical Test Suite for Random and Pseudorandom Number Generators for Cryptographic Applications," National Institute of Standards and Technology Special Publication 800-22, Revision 1a, Apr. 1, 2010, 131 pages.

Yu, M. et al., "Performance Metrics and Empirical Results of a PUF Cryptographic Key Generation ASIC," Proceedings of the 2012 IEEE International Symposium on Hardware-Oriented Security and Trust, Jun. 3, 2012, San Francisco, California, 8 pafges.

European Patent Office, Extended European Search Report Issued in Application No. 14828675.0, dated Mar. 20, 2017, Germany, 4 pages.

* cited by examiner

APPARATUS AND METHOD FOR TESTING RANDOMNESS

CROSS REFERENCE TO RELATED APPLICATIONS

The present application is a U.S. National Phase of International Patent Application Serial No. PCT/KR2014/006897, entitled "DEVICE AND METHOD FOR TESTING RANDOMNESS," filed on Jul. 28, 2014, which claims priority to Korean Patent Application No. 10-2013-0088696, entitled "DEVICE AND METHOD FOR TESTING RANDOMNESS," filed on Jul. 26, 2013, the entire contents of each of which are hereby incorporated by reference for all purposes.

TECHNICAL FIELD

The present invention relates to an apparatus and a method for testing randomness, and more particularly to an apparatus and a method for testing randomness which test randomness of physical unclonable function (PUF)-based hardware.

BACKGROUND ART

As the information-oriented society progresses, there is an increasing need for protection of personal privacy and a technique for building a security system for safely transmitting information via encoding and decoding also becomes an essential technology.

In the advanced information society, as diverse types of equipment become electronic, use of computing devices, such as an embedded system or system on chip (SoC), other than high-performance computer forms, drastically increases. For example, computing devices including radiofrequency identification (RFID), a smart card, a Universal Subscriber Identity Module (USIM), a one time password (OTP), or the like are widely utilized.

For safe use of such computing devices, building a security system is essentially required, through which security functions of protecting important information using encoding and decoding algorithms or of allocating access rights using identification and authentication functions may be carried out. In performing these security functions, a cryptographic key or unique identification (ID) is used, which is essential elements for the security system and is referred to as an identification key hereinafter. When an identification key is generated, a method of externally generating a pseudo random number (PRN), cryptographically safe externally, and storing the number in a nonvolatile memory, such as a flash memory and an electrically erasable programmable read-only memory (EEPROM), is generally used.

Recently, different attacks, such as side channel attacks and reverse engineering attacks, tend to be carried out to identification keys stored in computing devices. To safely generate and store an identification key against such kinds of attacks, physical unclonable function (PUF) technology is developing.

A PUF is a technique for generating an identification key using subtle differences in physical properties present in an electronic system and maintaining or storing the identification key unchanged, which is also referred to as hardware fingerprint.

A necessary condition for use of a PUF as an identification key is sufficiently secured randomness of the generated identification. PUF-based hardware with sufficiently secured randomness is determined as an acceptable product, whereas PUF-based hardware with low randomness needs to be determined as a defective product since a PUF-based identifier is possibly estimated due to low randomness of a PUF value. However, there is never disclosed such a determination method conventionally, and thus developing a randomness test apparatus and methods capable of determining whether PUF-based hardware has sufficient randomness is required. Further, a great number of bits of data are necessary for verifying randomness, while PUF-based hardware generates limited data only.

Meanwhile, since a defective product possibly happens due to defects among all circuits fabricated in a semiconductor process, a testing process for determining whether circuits are acceptable or defective is needed. Here, PUF-based hardware generates a random value, and thus a conventional testing process is unable to determine defectiveness of the PUF-based hardware.

That is, a method of testing defectiveness and randomness of PUF-based hardware needs to be developed.

DISCLOSURE OF INVENTION

Technical Goals

An aspect of the present invention provides an apparatus and a method for testing randomness which test defectiveness and randomness of physical unclonable function (PUF)-based hardware.

Technical Solutions

According to an aspect of the present invention, there is provided an apparatus for testing randomness including a randomness testing module to conduct a randomness test on physically unclonable function (PUF)-based hardware; and a processing device to determine whether the PUF-based hardware is defective on the basis of a randomness test result.

The randomness testing module may conduct a mono test.

The randomness testing module may test equality of 1s and 0s with respect to output values from the PUF-based hardware.

To test the equality, there may be used a method of receiving N-bit output values from the PUF-based hardware to count a number of 0 bits or 1 bits and determining that the PUF-based hardware is acceptable when the counted number satisfies a first range predetermined on N.

The randomness testing module may conduct a poker test.

The randomness testing module may test equality of patterns of values output from the PUF-based hardware.

To test the equality, there may be used a method of determining that the PUF-based hardware is acceptable when a result of counting each of frequencies of 0 to 15 represented by 4 bits satisfies a second range predetermined on N when N-bit output values output from the PUF-based hardware are divided by 4 bits.

The randomness testing module may conduct a run test on the PUF-based hardware.

Here, a run may mean a successive bit sequence of the same value and be referred to as a successive sequence.

In this case, the testing module may test whether a number of successive sequences of a value output from the PUF-based hardware is appropriate.

To test appropriateness of the number of successive sequences, there may be used a method of determining that the PUF-based hardware is acceptable when a changing frequency satisfies a third range predetermined on N, consecutively observing N-bit output values from the PUF-based hardware by 1 bit.

The randomness testing module may conduct a long-run test on the PUF-based hardware.

In this case, the testing module may test whether a long-run which is too long is present among output values from the PUF-based hardware.

To test presence of the long-run is present, there may be used a method of determining that the PUF-based hardware is defective when a length of a successive bit of the same value is out of a fourth range predetermined on N while counting the length of the successive bit of the same value, consecutively observing N-bit output values from the PUF-based hardware by 1 bit.

The foregoing test methods are examples for the testing module to conduct, and some of the test methods may be replaced with other types of random tests or additional test methods may also be used so as to test randomness of output values from the PUF-based hardware.

According to another aspect of the present invention, there is provided a method of testing randomness including conducting a randomness test on physically unclonable function (PUF)-based hardware; and determining whether the PUF-based hardware is defective on the basis of a randomness test result.

According to still another aspect of the present invention, there is provided a method of testing randomness including receiving a bit sequence including at least one of a first output value and a second output value from physically unclonable function (PUF)-based hardware outputting the first output value or the second output value; conducting a randomness test on the bit sequence; and determining whether the PUF-based hardware is defective on the basis of a randomness test result.

According to yet another aspect of the present invention, there is provided a computer-readable recording medium recoding a program to implement the method of testing randomness.

Effects of Invention

Various embodiments of the invention provide a randomness testing apparatus and method capable of testing randomness of PUF-based hardware. Particularly, according to the embodiments, a randomness test is performed on the basis of a statistical method, so that an output value from the PUF-based hardware is not exposed externally to improve security.

Further, as a randomness test with a simple statistical method is performed on the output value from the PUF-based hardware, the randomness testing apparatus may be configured as a device involving a small amount of operation, thereby achieving cost-efficiency.

In addition, since the PUF-based hardware outputs a random digital value, a conventional testing method may not be used to determine defectiveness of the PUF-based hardware. Although the PUF-based hardware is determined to be acceptable, the PUF-based hardware may not be used as a key value for a cryptography system without verifying randomness thereof. According to an embodiment of the invention, a randomness verifying method may be incorporated into a method of determining defectiveness at manufacture. That is, a single randomness test provides effects of two tests. Particularly, the randomness test is also able to determine defectiveness of PUF-based hardware which a conventional testing method is unable to determine.

BEST MODE FOR CARRYING OUT THE INVENTION

Figure 1:
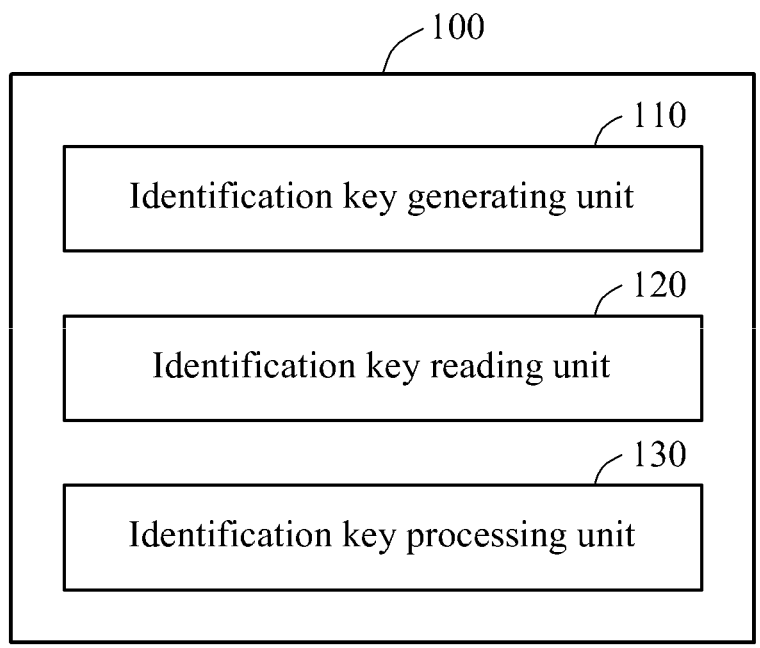
FIG. 1 illustrates an identification key generating apparatus.

Hereinafter, exemplary embodiments will be described in detail with reference to the accompanying drawings. These embodiments, however, are provided to restrictive or limiting purposes. Like reference numerals refer to the like elements throughout.

First, physical unclonable function (PUF)-based hardware will be described with reference to FIGS. 1 to 3, and an apparatus and a method for testing randomness of the PUF-based hardware will be described subsequently.

FIG. 1 illustrates an identification key generating apparatus 100.

An identification key generating unit 110 generates an identification key which does not vary over time using a semiconductor process, and the generated identification key is random and time-invariant.

The identification key generated by the identification key generating unit 110 may be, for example, an N-bit digital value (N is a natural number).

The most important factors in reliability of the generated identification key are randomness and time-invariance of the identification key.

The identification key generating unit 110 generates the identification key such that short circuits between nodes which occur in the semiconductor manufacturing process have randomness, in which the short circuits between the nodes do not change over time or on use environments and thus the once generated identification key does not change.

The identification key generating unit 110 generates the identification key based on whether conductive layers are short-circuited by contacts or vias formed between the conductive layers formed in the semiconductor manufacturing process.

The contacts or vias are designed to connect the conductive layers and thus generally have a size determined to short-circuit the conductive layers. In general design rules, a minimum contact or via size is determined to secure that conductive layers are short-circuited.

However, in implementing the identification generation unit 110 according to the present embodiment, the contacts or vias are intentionally formed with a smaller size than the size defined in the design rules so that part of the contacts or vias short-circuits the conductive layers and another part of the contacts or vias does not short-circuit the conductive layers, in which short circuits are stochastically determined.

In a conventional semiconductor process, it is considered as process failure that the contacts or vias do not short-circuit the conductive layers, whereas such failure is used for generating an identification key with randomness.

Setting the size of the contacts or vias will be described in detail.

Meanwhile, according to another embodiment, the identification key generating unit 110 determines spacing between conductive lines to be intentionally smaller than that in the design rules in the semiconductor manufacturing process, thereby stochastically determining short circuits of the conductive lines and generating an identification key with randomness.

Likewise in this embodiment, a random identification key is generated by intentionally deviating from a design rule which ensures openness between the conductive lines, that is, a predetermined level of spacing, in the conventional semiconductor manufacturing process.

The identification key generating unit 110 electrically generates the identification key according to the foregoing embodiments. A read transistor may be used to identify whether the contacts or vias short-circuit the conductive layers or whether the conductive lines are short-circuited.

Meanwhile, in an embodiment of adjusting the size of the contacts or vias, even though a ratio of contacts or vias which short-circuit the conductive layers to contacts or vias which do not short-circuit the conductive layers is adjusted to nearly ½ with equal probability by adjusting the size of the contacts or vias, a probability of a short circuit happening (represented by, for example, a digital value of 0) and a probability of no short circuit happening (represented by, for example, a digital value of 1) may not be ensured to be the exact same.

That is, the probability of the short circuit happening increases with the size of the contacts or vias being greater than the value determined in the design rules, while the probability of no short circuit happening increases with the size being smaller. When one of the probability of the short circuit happening and the probability of no short circuit happening is greater, the randomness of the generated identification key decreases.

Such a problem also arises in the embodiment of adjusting the spacing between the conductive lines.

Thus, according to one embodiment, the identification key generating apparatus 100 further includes an identification key processing unit 130 to process the identification key generated by the identification key generating unit 110 to secure the randomness. For reference, although this specification employs a term "identification key processing unit," such a term is not interpreted as limiting the unit to a component for processing the generated identification key through a separate technique or algorithm but is used to refer to a component which performs balancing between 0 and 1 so as to secure the randomness of the generated identification key.

Figure 2:
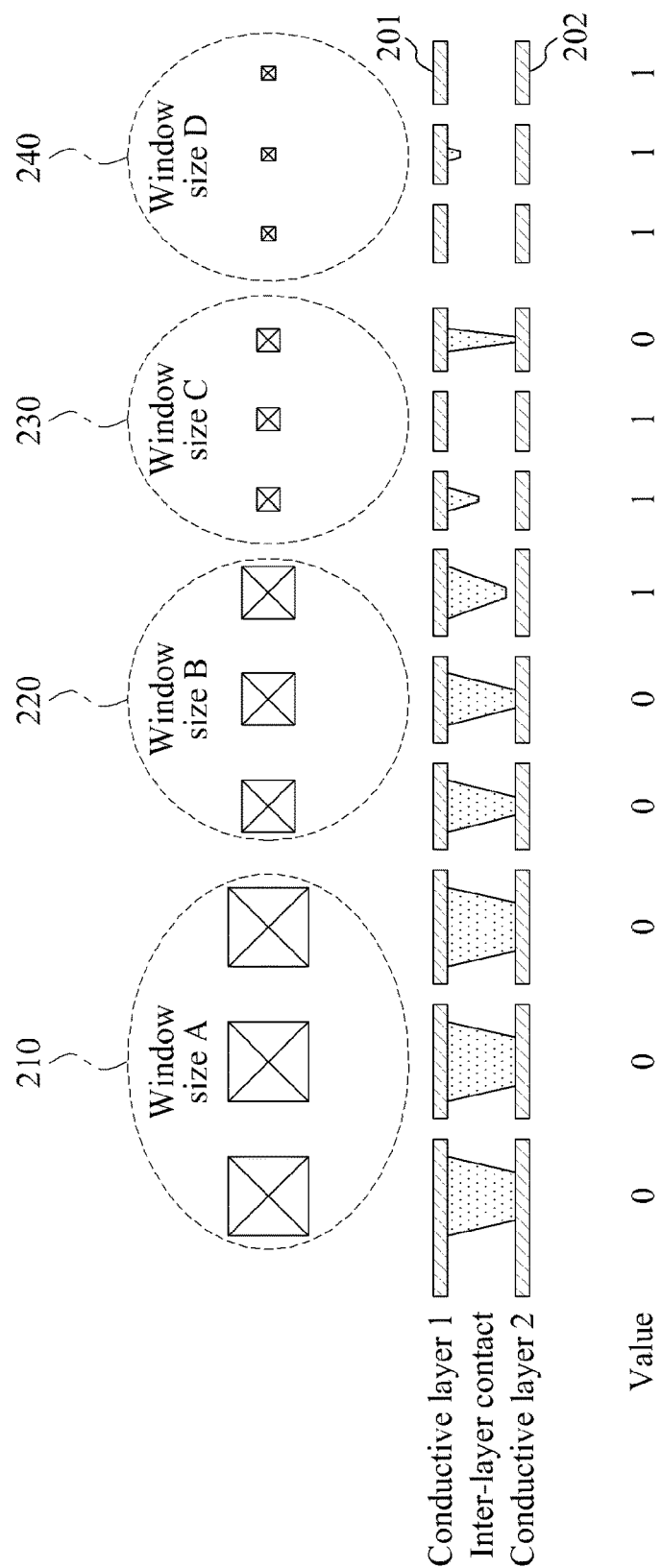
FIG. 2 is a diagram illustrating a configuration of an identification key generating unit.

FIG. 2 is a diagram illustrating a configuration of the identification key generating unit.

Vias formed between a metal 1 layer 202 and a metal 2 layer 201 in a semiconductor manufacturing process are illustrated.

In a group 210 including vias with a sufficiently large size according to the design rules, all vias short-circuit the metal 1 layer 202 and the metal 2 layer 201, all of which are represented by a digital value of 0.

In a group 230 including vias with a too small size, no vias short-circuit the metal 1 layer 202 and the metal 2 layer 201, all of which are represented by a digital value of 1.

In a group 220 including vias with a size between the size of the group 210 and the size of the group 230, part of the vias short-circuits the metal 1 layer 202 and the metal 2 layer 201 and a remaining part does not short-circuit the metal 1 layer 202 and the metal 2 layer 201.

The identification key generating unit 110 is configured to set the via size such that some vias short-circuit the metal 1 layer 202 and the metal 2 layer 201 and some other vias do not short-circuit the metal 1 layer 202 and the metal 2 layer 201 as in the group 220.

The design rules for the via size vary depending on semiconductor manufacturing processes. For example, if the via size is set to 0.25 micron (μm) according to the design rules for the via size in a 0.18-μm complementary metal-oxide-semiconductor (CMOS) process, the identification key generating unit 110 sets the via size to 0.19 μm so that short circuits between metal layers are stochastically distributed.

A probability distribution of short circuits ideally assigns a probability of 50% to a short circuit, and the identification key generating unit 110 is configured to set the via size so that the probability distribution is as close to 50% as possible. The via size may be determined by experiments based on processes.

Figure 3:
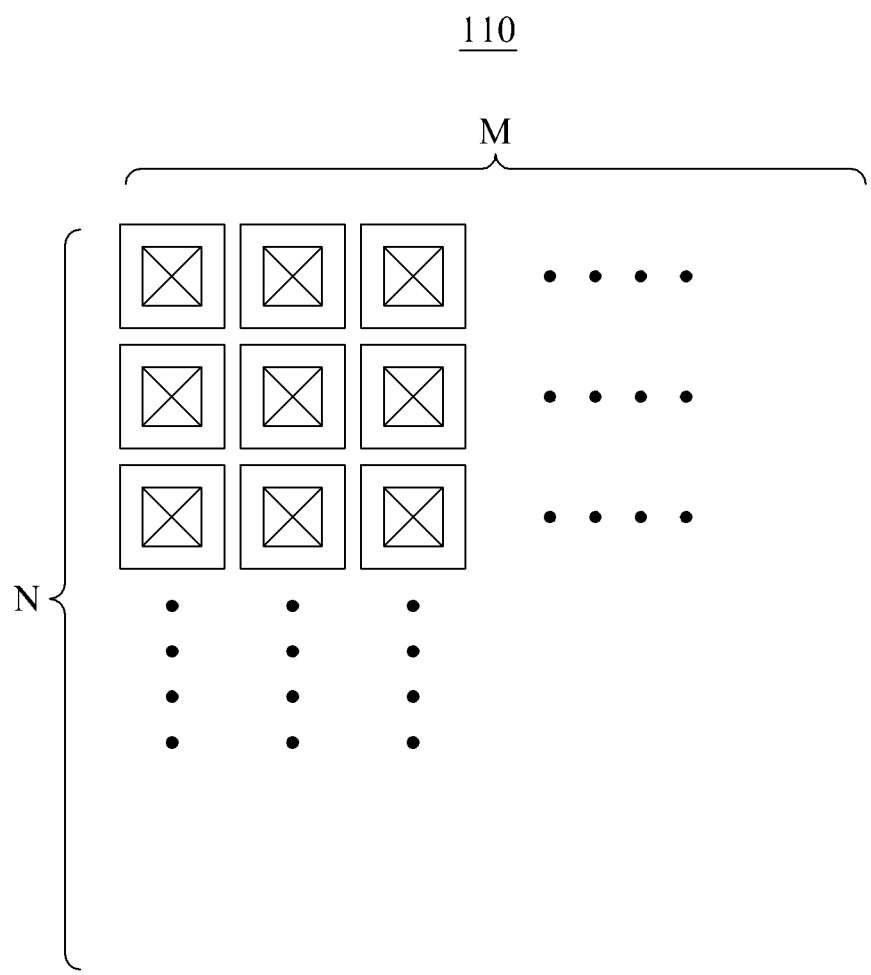
FIG. 3 is a diagram illustrating a structure of a via or contact array formed in a semiconductor layer for the identification key generating unit 110 to generate an identification key according to an embodiment of the present invention.

FIG. 3 is a diagram illustrating a structure of a via or contact array formed in a semiconductor layer for the identification key generating unit 110 to generate an identification key according to an embodiment.

M vias in width and N vias in length, that is, M*N vias in total, are formed between metal layers deposited on a semiconductor substrate (where M and N are natural numbers).

The identification key generating unit 110 generates an M*N-bit identification key based on whether each of the M*N vias short-circuits the metal layers (represented by a digital value of 0) or does not short-circuit the metal layers (represented by a digital value of 1).

The M*N-bit identification key is read by an identification key reading unit 120.

Meanwhile, the foregoing PUF-based hardware requires a high level of randomness. Ideally, a level of randomness which enables a probability that a value of 0 is output and a probability that a value of 1 is output to be the same, ½, is needed. That is, PUF-based hardware is considered acceptable with a high level of randomness enabling the M*N bits to include M*N/2 0s and M*N/2 1s.

Accordingly, randomness test apparatuses and methods for conducting a randomness test for previously manufactured PUF-based hardware are provided as below. The PUF-based hardware based on the vias illustrated above is provided for illustrative purposes only, and any kind of PUFs may be involved. For example, it is obvious that the randomness tests according to embodiments may be performed for PUF-based hardware disclosed in 10-2010-0125633, 10-2011-0013269, 10-2011-0029429, 10-2012-

0033362, 10-2009-0035416, 10-2012-0089227, 10-2011-0077271, 10-2009-0096085, 10-2010-0039857, 10-2007-0122914, 10-2012-0091197, 10-2013-0129262, 10-2013-0029616, 10-2013-0043954, 10-2013-0101893, 10-2013-0168530, 10-2013-0168558, 10-2013-0088696, 10-2013-0103939, 2011-0029430, 10-2013-0105385, 10-2013-0105470, 10-2013-0107217, 10-2013-0107304, 10-2013-0116424, 10-2013-0120297, 10-2013-0120141, 10-2013-0120043, 10-2014-0042360, 10-2014-0042362, and 10-2014-0046021.

As described above, as the PUF-based hardware outputs a random output value, defect testing is not carried out with a conventional testing method. Further, the PUF-based hardware needs to acquire a predetermined level of randomness and thus also requires a method for identifying whether an output value is random. Hereinafter, a method of simultaneously conducting both defectiveness and randomness testing for PUF-based hardware through a randomness test will be described in detail.

Figure 4A:
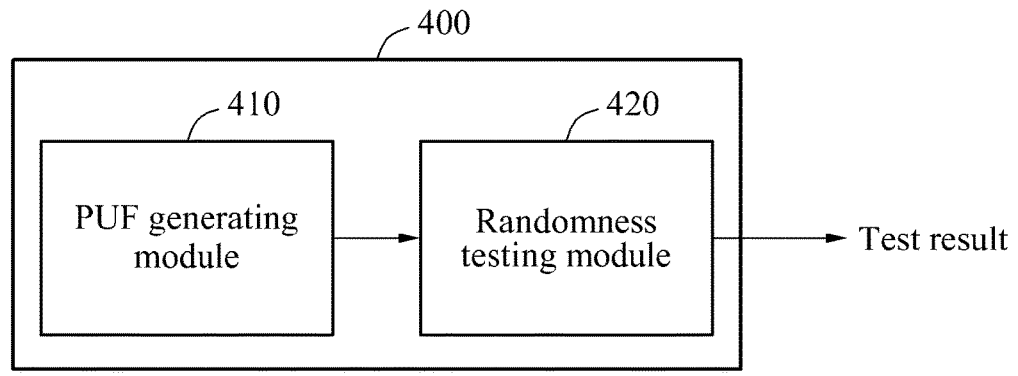
FIGS. 4A to 4C are block diagrams illustrating randomness testing apparatuses according to various embodiments.
Figure 4B:
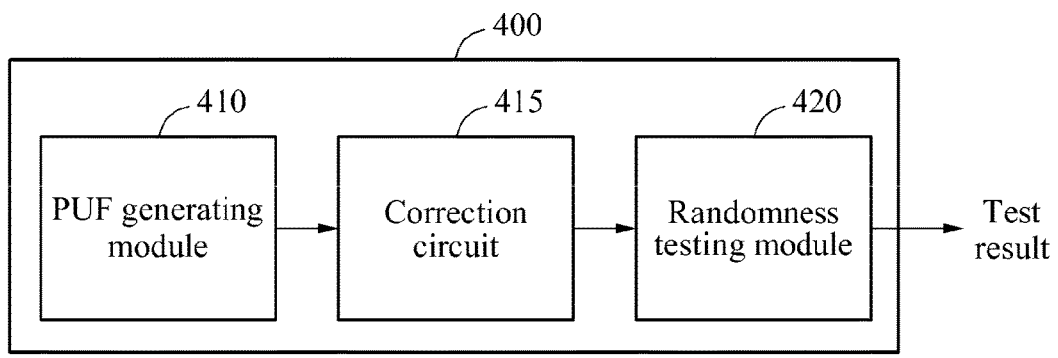
Figure 4C:
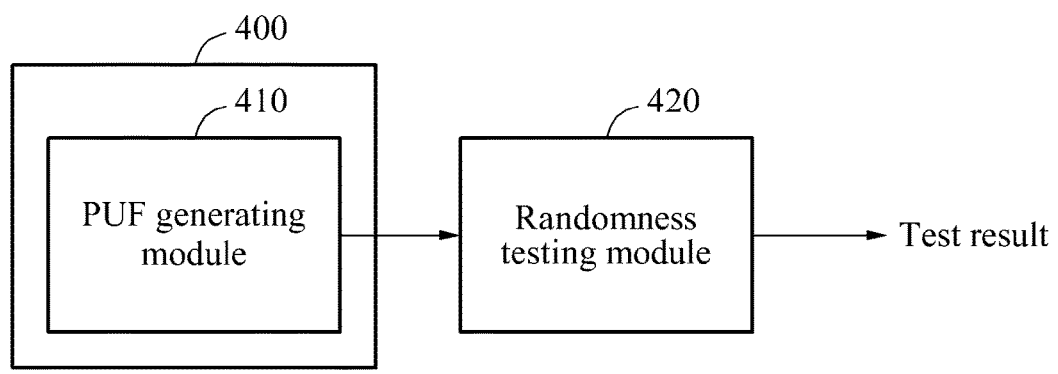

FIGS. 4A to 4C are block diagrams illustrating randomness testing apparatuses according to various embodiments.

First, referring to FIG. 4A, a randomness testing apparatus 400 may include a PUF generating unit 410 and a randomness testing module 420.

The PUF generating unit 410 may generate an output value from PUF-based hardware. For example, the PUF generating unit 410 may output a first output value (for example, 1) or a second output value (for example, 0). Here, although the first output value is illustrated as 1, the first output value may be 0 and the second output value may be 1. The PUF generating unit 410 may generate N output values, where N is a natural number. The output values may include at least one of 0 and 1 and thus may be referred to as a bit sequence. A bit sequence may be managed by 1 bit or 4 bits, which will be described in detail. Here, managing a bit sequence by 1 bit or 4 bits may mean that the randomness testing module 420 may receive the bit sequence by 1 bit or 4 bits. Alternatively, managing a bit sequence by 1 bit or 4 bits may mean that the randomness testing module 420 may receive the bit sequence by random bit and conduct a randomness test by 1 bit or 4 bits. That is, the randomness testing module 420 may perform the randomness test by 1 bit or 4 bits regardless of a size of the received bit sequence. In this case, the randomness testing module 420 may also conduct the randomness test, for example, by 1 bit or 4 bits after receiving all target bits.

The PUF generating unit 410 may be realized as PUF-based hardware. When the PUF generating unit 410 is realized as PUF-based hardware, the PUF generating unit 410 may not be necessarily included in the randomness testing apparatus 400 but be configured as being attached at test. Alternatively, the PUF generating unit 410 may be configured in an integrated form with the randomness testing apparatus 400.

Alternatively, the PUF generating unit 410 may be configured as an interface receiving an output value, that is, a bit sequence, from the PUF-based hardware. When the PUF generating unit 410 is configured as the interface, the PUF generating unit 410 may be connected to the outside PUF-based hardware to receive the output value from the PUF-based hardware and to output the output value to the randomness testing module 420. In this case, the PUF generating unit 410 may merely output a testing result only so that the output value from the PUF-based hardware is not exposed.

The randomness testing module 420 may conduct a randomness test on the PUF-based hardware. The randomness testing module 420 may receive the output value from the PUF-based hardware, for example, a bit sequence, from the PUF generating unit 410. The randomness testing module 420 may conduct the randomness test on the received output value from the PUF-based hardware. For example, the randomness testing module 420 may test whether distributions of 0s and 1s in the bit sequence have randomness.

The randomness testing module 420 may conduct at least one of a mono test, a poker test, a run test and a long-run test using the output value, that is, the bit sequence. Each randomness test will be described in detail.

A processing apparatus (not shown) may determine defectiveness of the PUF-based hardware on the basis of a randomness test result. When randomness of the PUF-based hardware is a preset level or higher, the processing apparatus (not shown) may determine the PUF-based hardware acceptable. For example, when the randomness testing module 420 performs a mono test, the processing apparatus (not shown) may determine the PUF-based hardware acceptable when a number of 1s is within a preset range. When the number of 1s is out of the range, the processing apparatus (not shown) may determine the PUF-based hardware defective. The processing apparatus (not shown) may determine the defectiveness of the PUF-based hardware on the basis of at least one result of the foregoing four types of randomness tests. The processing apparatus (not shown) may also determine the defectiveness by applying a weighting to the foregoing diverse randomness tests.

The processing apparatus (not shown) may be disposed outside the randomness testing apparatus 400 or be combined with the randomness testing module 420 as single hardware.

FIG. 4B is a block diagram illustrating a randomness testing apparatus according to another embodiment. The embodiment shown in FIG. 4B may further include a correction circuit 415 as compared with the embodiment shown in FIG. 4A. The correction circuit 415 may correct the output value from the PUF generating unit 410 and transmit the output value to the randomness testing module 420.

FIG. 4C is a block diagram illustrating a randomness testing apparatus according to still another embodiment. The embodiment shown in FIG. 4C clearly shows that the randomness testing module 420 may be physically separated from the PUF generating unit 410.

Figure 5:
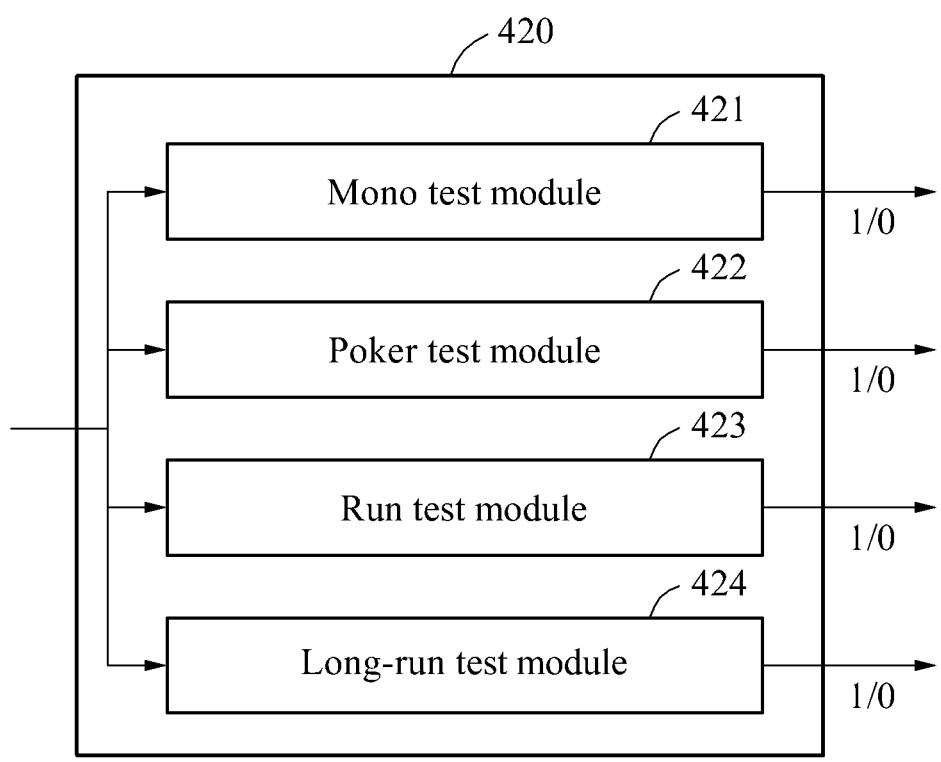
FIG. 5 is a block diagram illustrating a randomness testing module according to an embodiment.

FIG. 5 is a block diagram illustrating the randomness testing module according to an embodiment.

As illustrated in FIG. 5, the randomness testing module 420 according to the embodiment may include a mono test module 421, a poker test module 422, a run test module 423 and a long-run test module 424. The mono test module 421, the poker test module 422, the run test module 423 and the long-run test module 424 may respectively conduct randomness tests on the basis of input output values from the PUF-based hardware.

A mono test may determine equalities of numbers of 0s and 1s in a bit sequence to test randomness. The mono test may observe a value of each bit in the bit sequence by 1 bit, thereby determining the equalities of the number of 0s and 1s.

A poker test may determine whether frequencies of 0 to 15 represented by separate 4 bits are equal to one another when a bit sequence is separated into 4-bit units, thereby testing randomness.

A run test may determine continuity of 0s or 1s in a bit sequence to test randomness. The run test may identify a number of successive sequences in the bit sequence and test randomness based on the number of successive sequences.

A long-run test may determine continuity of 0s or 1s in a bit sequence to test randomness. The long-run test may test randomness based on whether a successive sequence having a length exceeding a preset threshold is present.

The aforementioned randomness tests may be performed in parallel and output test results. The mono test module 421, the poker test module 422, the run test module 423 and the long-run test module 424 may output 1 or 0 as result values. Here, "1" represents that a randomness test is still in progress or a randomness test result is failure, while "0" represents passing a randomness test.

While the foregoing four types of randomness test methods are provided for illustrative purposes only, it should be easily understood by those skilled in the art that these randomness tests may be replaced by alternative types of standardized randomness tests. Specifically, part or all of the four randomness tests may be replaced with different kinds of standardized randomness tests. Moreover, it will be understood by those skilled in the art that the scope of the invention defined by claims is not limited by a randomness type.

Figure 6:
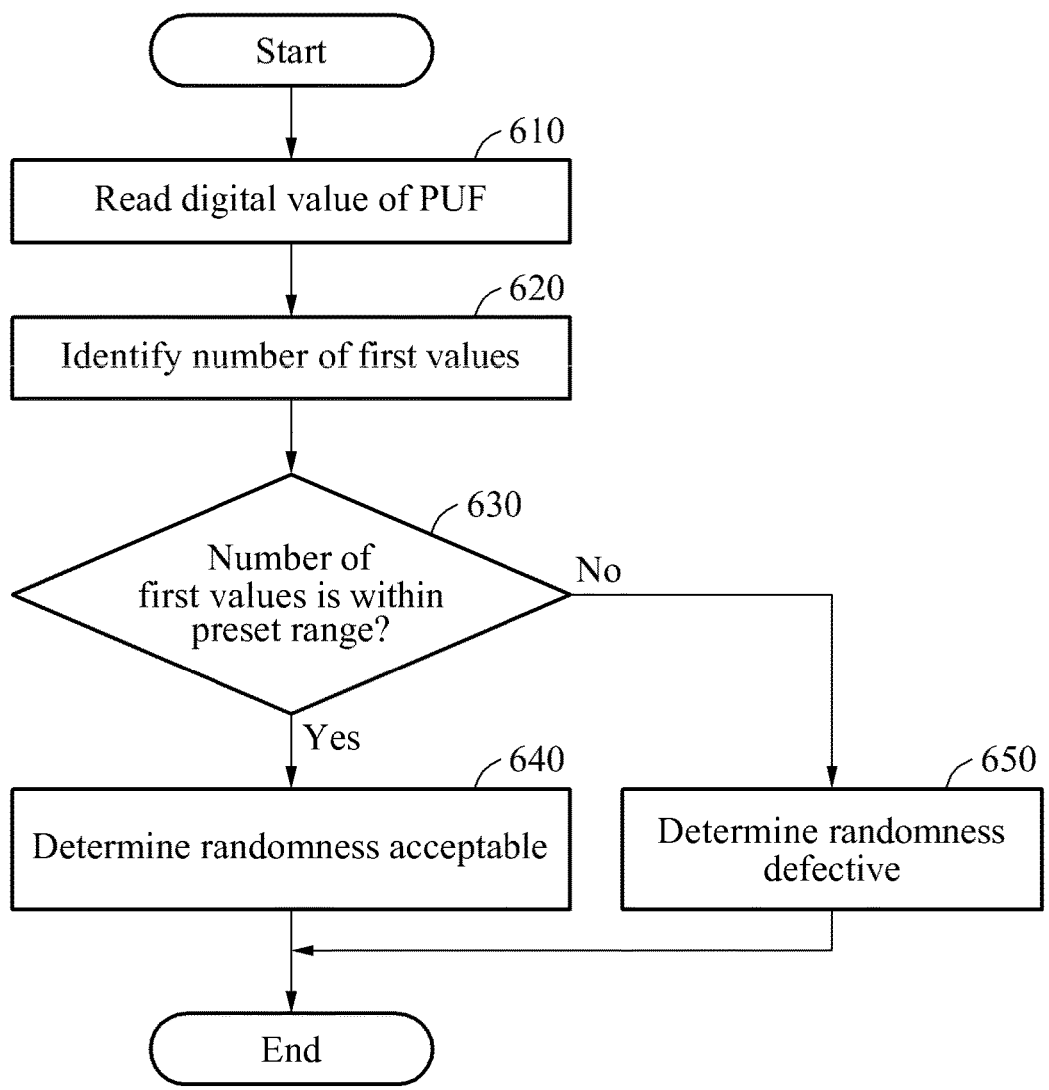
FIG. 6 is a flowchart illustrating a randomness test method according to an embodiment.

FIG. 6 is a flowchart illustrating a randomness test method according to an embodiment. The embodiment shown in FIG. 6 may be a flowchart illustrating a mono test, for example.

In operation 610, the randomness test method may read an output value, that is, a digital value, from PUF-based hardware. As described above, the output value may be a bit sequence including at least one of 0 and 1. The present embodiment assumes that the bit sequence has a size of 2500 bits. Accordingly, the bit sequence from PUF-based hardware with perfect randomness may include 1250 1s and 1250 0s.

In operation 620, the randomness test method may identify a number of first output values in the bit sequence. Here, the first output values may be 1 or 0.

In operation 630, the randomness test method may determine whether the number of the first output values is within a preset range. As described above, the bit sequence from the PUF-based hardware with perfect randomness may have 1250 first values. However, a deviation range of perfect randomness may also be considered to have randomness. In one embodiment, the randomness test method may set a deviation to 64. In this case, a preset range for passing randomness may be between 1185 and 1315. Determining whether the number of the first output values falls within the preset range will be described in detail.

In operation 640, the randomness test method may determine the PUF-based hardware acceptable when the number of the first values is within the preset range. In operation 650, the randomness test method may determine the PUF-based hardware defective when the number of the first values is out of the preset range.

Figure 7:
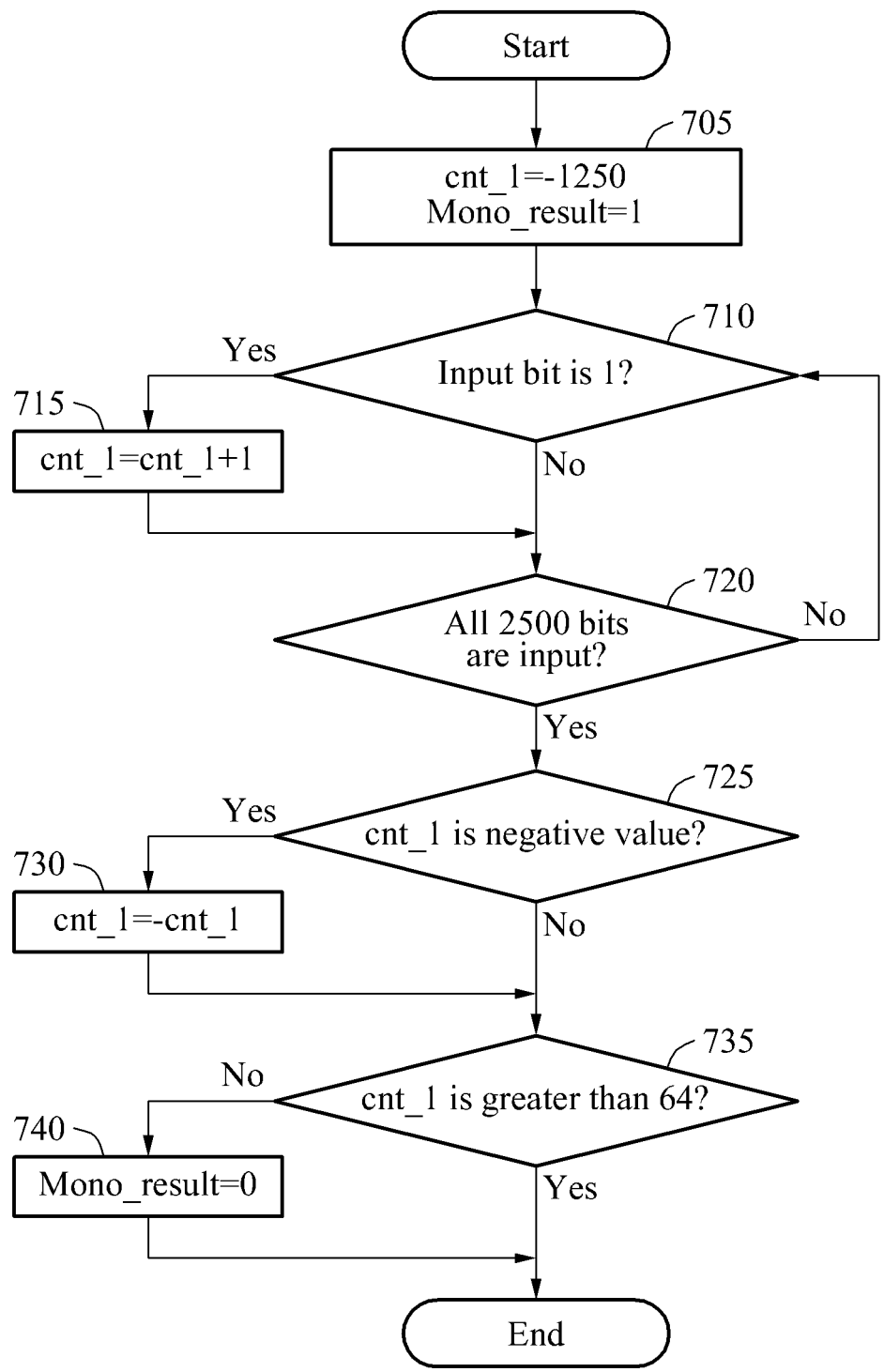
FIG. 7 is a flowchart illustrating a mono test according to an embodiment.

FIG. 7 is a flowchart illustrating a mono test. The embodiment shown in FIG. 7 assumes that the mono test tests randomness of a bit sequence, which is received with a size of 2500 bits from PUF-based hardware.

In operation 705, the mono test may set an initial value of a number (cnt_1) of first values to −1250, which is for facilitating a run test and will be described again. The mono test may set a mono test result (Mono_result) to 1.

In operation 710, the mono test may determine whether an input bit is a first value. The present embodiment assumes that the first value is 1.

In operation 715, the mono test increases the number (cnt_1) of first values by 1 when the input bit is the first value. In operation 720, the mono test maintains the number (cnt_1) of first values as it is when the input bit is a second value.

In operation 720, the mono test may determine whether operations 710 to 715 are performed for all bits. When operations 710 to 715 are not performed for all bits, the mono test may perform operations 710 to 715 on a next bit. When operations 710 to 715 are performed for all bits, the mono test may determine whether the number (cnt_1) of first values is a negative value in operation 725.

In operation 730, when the number (cnt_1) of first values is a negative value, the number (cnt_1) of first values may be replaced with a positive value. In operation 735, the mono test may determine whether the number (cnt_1) of first values is greater than 64.

When the number (cnt_1) of first values is greater than 64, the mono test may output the mono test result (Mono_result) maintained 1. Here, a mono test result (Mono_result) of 1 may mean that the randomness is defective. When the number (cnt_1) of first values is 64 or smaller, the mono test result (Mono_result) may be replaced with 0 and output. Here, a mono test result (Mono_result) of 0 may mean that the randomness is acceptable.

Figure 8:
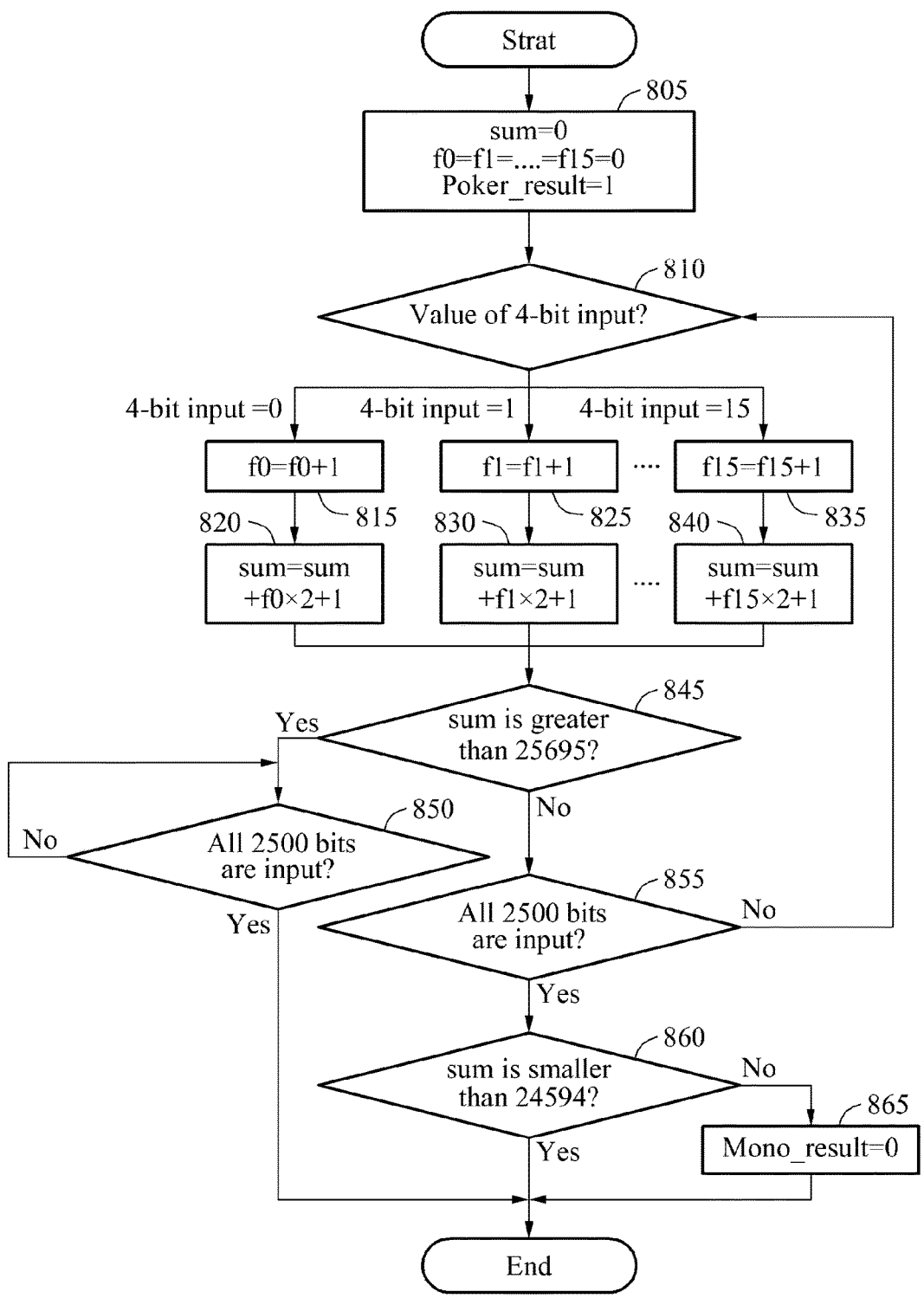
FIG. 8 is a flowchart illustrating a poker test according to an embodiment.

FIG. 8 is a flowchart illustrating a poker test. The embodiment shown in FIG. 8 assumes that the poker test tests randomness of a bit sequence, which is received with a size of 2500 bits from PUF-based hardware.

A poker test may manage the bit sequence by separate 4 bits. The poker test may test whether frequencies of 0 to 15 represented by 4 bits are equal. A condition for passing the test is illustrated in Equation 1.

$$4.6 < \frac{16}{625} \times \sum_{0}^{15} f^2(i) - 625 < 32.8 \qquad \text{[Equation 1]}$$

Here, f(i) represents frequencies of separate four bits, 0000, 0001, 0010, . . . , 1111. When hardware implementation of Equation 1 is difficult to achieve, Equation 1 may be converted to Equation 2, equivalent to Equation 1.

$$24593.75 < \sum_{0}^{15} f^2(i) < 25695.3125 \qquad \text{[Equation 2]}$$

In addition, when hardware implementation of squaring in Equation 2 is difficult to achieve, Equation 3 obtained by replacing squaring with a progression of differences may be used.

$$24594 \leq \sum_{i=0}^{15} \sum_{k=1}^{f(i)} (2k+1) \leq 25695 \qquad \text{[Equation 3]}$$

Here, k is a natural number for calculation. When Equation 3 is used, a square is not required in hardware implementation. The poker test according to the embodiment may stop calculating f(i) and output a result of failure when a sum is greater than 25695. The poker test may change the result into success to output when the sum is 24594 or greater. The foregoing process will be described in detail with reference to FIG. 8.

In operation 805, the poker test may set the sum to 0, and set all of values of f(0) to f(15) to 0. Also, the poker test may set an initial value of a result (Poker_result) to 1.

In operation 810, the poker test may determine a value of a sub-bit sequence with a 4-bit size. The poker test may conduct operations 815 to 835 based on the value of the sub-bit sequence. For example, when the value of the sub-bit sequence is 0, the poker test may increase the value of f(0) by 1 in operation 815 and increase the sum by f(0)*2+1 in operation 820. When the value of the sub-bit sequence is 1, the poker test may increase the value of f(1) by 1 in operation 825 and increase the sum by f(1)*2+1 in operation 830. When the value of the sub-bit sequence is 15, the poker test may increase the value of f(1) by 1 in operation 835 and increase the sum by f(15)*2+1 in operation 840.

Meanwhile, it will be easily understood by those skilled in the art that a similar procedure is carried out when the value of the sub-bit sequence is 2 to 14.

In operation 845, the poker test may determine whether the sum is greater than 25695. When the sum is greater than 25695, the poker test may determine whether the test is performed for all of the 2500 bits in operation 850 and terminate the test. When the sum is 25695 is smaller, the poker test may determine whether the test is performed for all of the 2500 bits in operation 855. When the test is not performed for all of the 2500 bits, the poker test returns to operation 810 and repeat the test for a next sub-sequence. When the test is performed for all of the 2500 bits, the poker test may determine whether the sum is smaller than 24594 in operation 860. When the sum is 24594 or greater, the poker test may replace a result (Mono_result) with 0 and output the result in operation 865. When the sum is smaller than 24594, the poker test may output the result (Mono_result) maintained 1. Here, a result (Mono_result) of 0 may mean that the randomness is acceptable, while the result (Mono_result) of 1 may mean that the randomness is defective.

The foregoing method employs an operation using a progression of differences instead of squaring, thereby providing an effect of reducing an operation area. For example, for squaring, 16 squaring modules with an 8*8 size and 15 addition modules with a 16*16 size are needed since f(i) has an 8-bit size. For the progression of differences, only one addition module is necessary, and accordingly an operation involving a large area is not required.

Moreover, the method may also enable an intermediate value to be identified. When squaring is carried out, specific values are concentrated in a particular portion in a bit sequence. Thus, although a poker test result is possibly identified as failure early, all f(i) values need to be inefficiently counted to acquire a sum. When the progression of differences is used, an interim sum may be identified during a calculation, and thus failure is possibly identified early, enabling an adaptive randomness test. Accordingly, additional power consumption may be avoided and the register size may be reduced.

Table 1 illustrates relationships between a register size and an addition module size according to an adaptive randomness test.

TABLE 1

| | Maximum value | | Register size (bit) | | | Addition module size (bit) | |
|---|---|---|---|---|---|---|---|
| | Sum | f(i) | Sum | f(i) | Number | Sum | f(i) |
| Worst case | 391250 | 625 | 19 | 10 each, 160 in total | 179 | 19 | 10 each |
| Progression of differences used | 25695 + 160 | 160 | 15 | 8 each, 128 in total | 143 | 15 | 8 each |

Hardware may need to be designed in preparation for a worst case. In the worst case, all 4-bit sub-bit sequences may have an input pattern of 0000. In this case, f(0) is 625, and the sum is 391250. However, the method in the embodiment using the progression of differences identifies an interim sum in advance before the worst case, determines that the test result is failure and stops the randomness test early.

As listed in Table 1, in the worst case, a register needs 19+10*16=179 bits in total as the sum needs 19 bits for storing 391250 and each f(i) needs 10 bits for 625 with respect to i being from 0 to 15.

On the contrary, the method using the progression of differences stops the randomness test when the sum is greater than a maximum value of 25695 for continuing the randomness test. Under this condition, when the sub-bit sequence of 0000 is continually input, the sum is 25600 if the same pattern is input 160 times, and the sum is 25291 if the sub-bit sequence of 0000 is input once more, that is, f(0) is 161, and thus the randomness test may stop. In this case, 15 bits are required to store the sum, and 8 bits are required for f(i) to store up to 161. Accordingly, 15+8*16=143 bits are needed in total, showing that a remarkably reduced operation area is needed.

In addition to the register, an addition module for calculating an interim sum of the sum and counting f(i) is also needed. The method using the progression of differences may employ a reduced number of addition modules, one 15-bit addition module and 16 8-bit addition modules, from one 19-bit addition module and 16 10-bit addition modules conventionally used.

Figure 9:
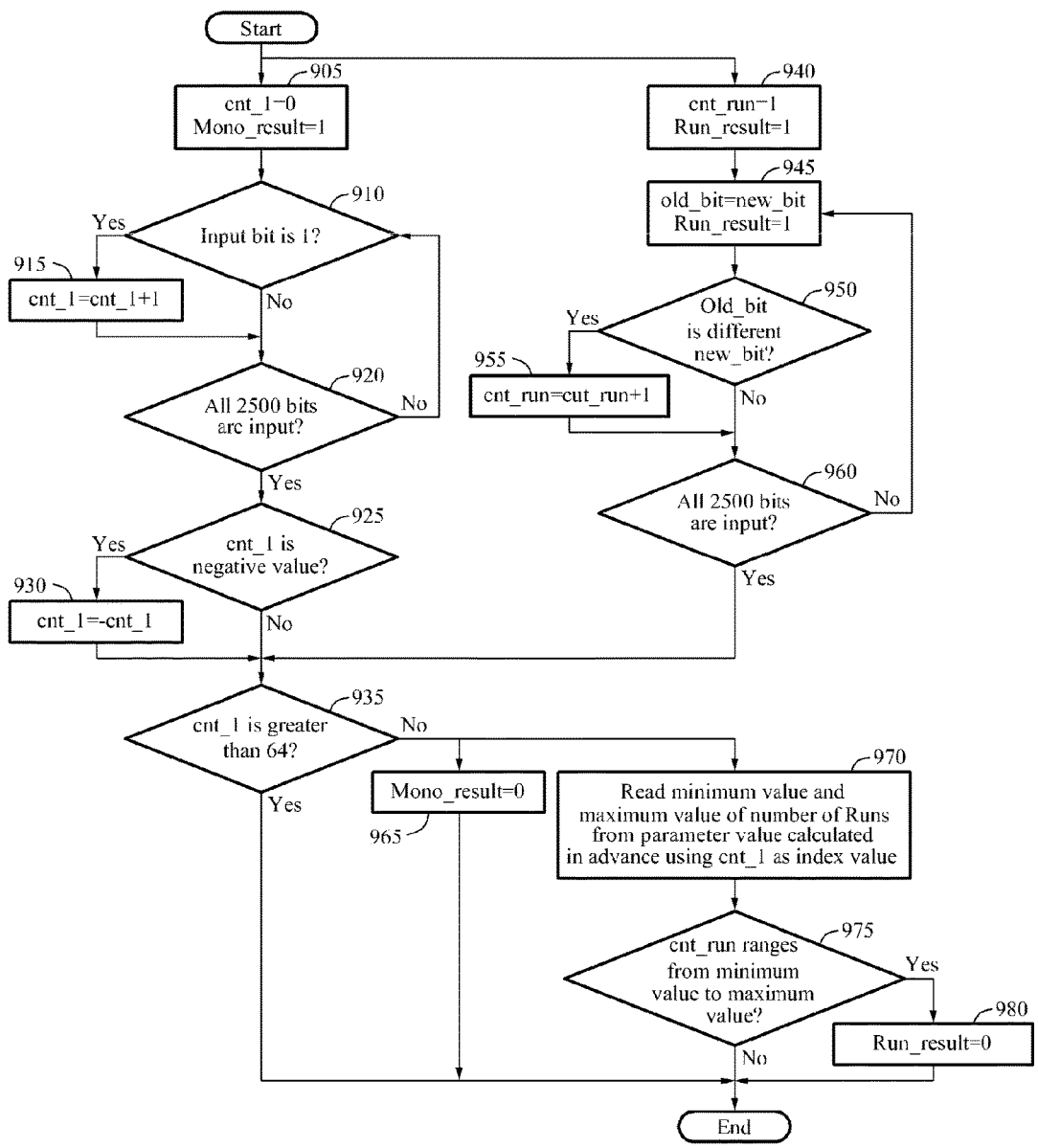
FIG. 9 is a flowchart illustrating a run test according to an embodiment.

FIG. 9 is a flowchart illustrating a run test. The embodiment shown in FIG. 9 assumes that the run test tests randomness of a bit sequence, which is received with a size of 2500 bits from PUF-based hardware. The run test may test the randomness on the basis of whether a number of successive sequences in the bit sequence is sufficient. For example, when the bit sequence is 11000011101110010, there are eight successive sequences such as "11," "0000," "111," "0," "111," "00," "1," and "0." The randomness is interpreted as decreasing with a smaller number of successive sequences and as increasing with a greater number of successive sequences, and the run test may test the randomness on the basis of the number of successive sequences.

The run test may test the randomness based on, for example, whether the number of successive sequences is within a preset range. Specifically, the run test may test the randomness on the basis of Equation 4.

$$m-b \leq X \leq m+b \qquad \text{[Equation 4]}$$

Here, m may 5000p, b may be 257.5828p, p may be $q*(1-q)$, and q may be a number of first values/2500. q may be set on the basis of, for example, a mono test result. Meanwhile, when the run test is performed, m and b may be calculated in advance to be set as parameters. m and b have symmetrical values when the number of 1s is 1250, for which |number of first values−1250| may be obtained in the mono test and a result thereof is shown in Table 2.

TABLE 2

| | |number of first values −1250| | | | | | |
|---|---|---|---|---|---|---|---|
| | 0x00~0x15 | 0x16~0x1c | 0x1d~0x28 | 0x29~0x2d | 0x2e~0x35 | 0x36~0x3a | 0x3b~0x40 |
| m − b | 1186 | | 1185 | | 1184 | | 1183 |
| m + b | 1314 | | 1313 | | 1312 | | 1311 |

In the mono test, when |number of first values-1250| is greater than 64, a run test result is meaningless. Thus, the run test may be set to be conducted only when |number of first values−1250| is 64 or smaller.

Meanwhile, operations 905 to 935 and 965 correspond to the mono test process, which has been illustrated above, and thus descriptions thereof are omitted herein. As illustrated, the run test may be carried out along with the mono test. The run test may be performed in parallel with the mono test.

In operation 940, the run test may set a number (cnt_run) of successive sequences to 1. The run test may set a run test result (Run_result) to 1. A run test result (Run_result) of 1 may mean that the randomness is defective. A run test result (Run_result) of 0 may mean that the randomness is acceptable.

In operation 945, the run test may replace a used new bit (new_bit) with an old bit (old_bit) and set a newly input bit as a new bit (new_bit). In operation 950, the run test may determine whether the new bit (new_bit) and the old bit (old_bit) are different from each other.

When the new bit (new_bit) and the old bit (old_bit) are different, the run test may increase the number (cnt_run) of successive sequences by 1 in operation 955. When the new bit (new_bit) and the old bit (old_bit) are the same, the run test may determine the run test is performed on all 2500 bits in operation 960.

In operation 970, the run test may read a minimum value and a maximum value of the number of successive sequences, that is, boundary values of a preset range, from a parameter value calculated in advance using the number (cnt_1) of 1s in the bit sequence calculated in the mono test as an index value. In operation 975, the run test may determine whether the number (cnt_run) of successive sequences ranges from the minimum value to the maximum value. That is, the run test may determine whether the number (cnt_run) of successive sequences is included within the preset range. When the number (cnt_run) of successive sequences is within the preset range, the run test may output the result (Run_result) replaced with 0. When the number (cnt_run) of successive sequences is out of the preset range, the run test may output the result (Run_result) maintained 1.

Figure 10:
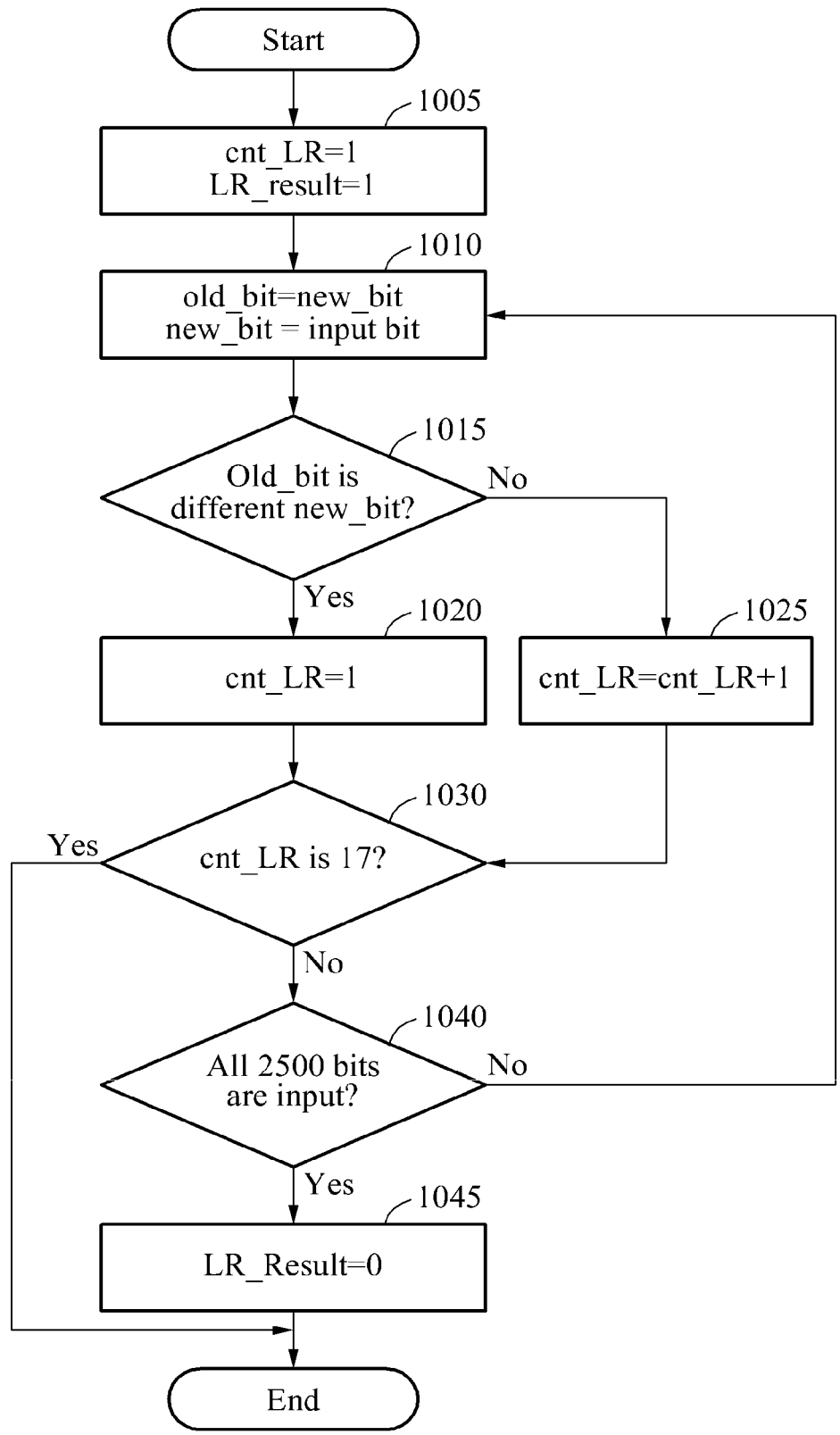
FIG. 10 is a flowchart illustrating a long-run test according to an embodiment.

FIG. 10 is a flowchart illustrating a long-run test. The embodiment shown in FIG. 10 assumes that the long-run test tests randomness of a bit sequence, which is received with a size of 2500 bits from PUF-based hardware.

The long-run test may test the randomness by determining whether a length of a successive sequence in the bit sequence is a preset threshold or longer. For example, the long-run test may finish the randomness test when a successive sequence having a length of 17 or longer is present.

In operation 1005, the long-run test may set a length (cnt_LR) of a successive sequence to 1. The long-run test may set a result (LR_result) to 1.

In operation 1010, the long-run test may replace a used new bit (new_bit) with an old bit (old_bit) and set a newly input bit as a new bit (new_bit). In operation 1015, the long-run test may determine whether the new bit (new_bit) and the old bit (old_bit) are different from each other.

When the new bit (new_bit) and the old bit (old_bit) are different, the long-run test may set the length (cnt_LR) of the successive sequence back to 1 in operation 1020. When the new bit (new_bit) and the old bit (old_bit) are the same, the run test may increase the length (cnt_LR) of the successive sequence by 1 in operation 1025.

In operation 1030, the long-run test may determine whether the length (cnt_LR) of the successive sequence is equal to 17. When the length (cnt_LR) of the successive sequence is equal to 17, the test terminates immediately. When the length (cnt_LR) of the successive sequence is not 17, the long-run test may identify whether all of the 2500 bits are input in operation 1040. When all of the 2500 bits are not input, the long-run test may return to operation 1010 and repeat the foregoing operations. When the length (cnt_LR) of the successive sequence is smaller than 17 and all of the 2500 bits are input, the long-run test may output the result (LR_result) replaced with 0. Here, a result (LR_result) of 0 may mean that the randomness is acceptable, and a result (LR_result) of 1 may mean that the randomness is defective.

Figure 11:
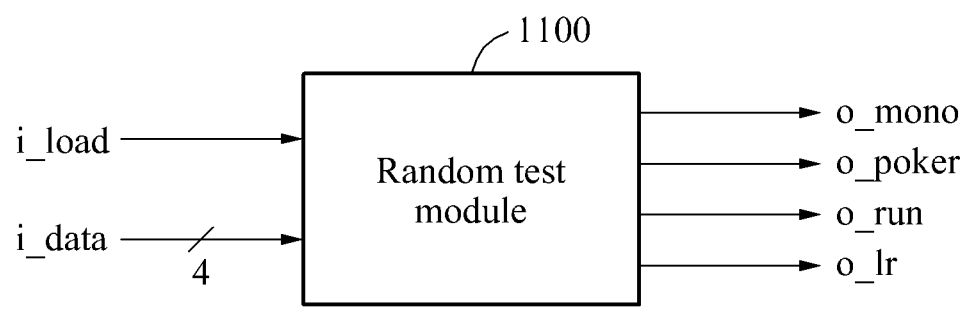
FIG. 11 is a block diagram illustrating a random test module according to an embodiment.

FIG. 11 is a block diagram illustrating a random test module according to an embodiment.

As shown in FIG. 11, a first bit sequence (i_load) may be input to the random test module 1100. Here, the first bit sequence (i_load) may input by 1 bit. A second bit sequence (i_data) may be input to the random test module 110. The second bit sequence (i_data) may be input by 4 bits. The first bit sequence (i_load) may inform the random test module 1110 of a time when the second bit sequence (i_data) is input.

The random test module 1100 may apply the mono test, the poker test, the run test and the long-run test to at least one of the first bit sequence (i_load) and the second bit sequence (i_data). The random test module 1110 may output a mono test result (o_mono), a poker test result (o_poker), a run test result (o_run) and a long-run test result (o_lr). The test results may be displayed through four pins when the tests terminate.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

According to the above-described exemplary embodiment of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

The invention claimed is:

1. An apparatus including physically unclonable function (PUF) hardware comprising:
the PUF hardware including contacts or vias between a plurality of conductive layers, the contacts or vias of a size determined to produce a probability of short circuits;
the PUF hardware being configured to output a value being generated from a determination of whether a short circuit connection exists between conductive layers;
a randomness testing module to conduct a randomness test on the value; and
a processing device to determine whether the PUF hardware is defective based on an output of the randomness testing module.

2. The apparatus of claim 1, wherein the randomness testing module conducts a mono test on the PUF hardware.

3. The apparatus of claim 2, wherein the randomness testing module tests equality of distributions of 1s and 0s of the PUF hardware.

4. The apparatus of claim 3, wherein the randomness testing module tests the equality by receiving N-bit output values from the PUF hardware to count a number of 0 bits or 1 bits and determining whether the counted number satisfies a first range predetermined on N, N being a natural number.

5. The apparatus of claim 1, wherein the randomness testing module conducts a poker test on the PUF hardware.

6. The apparatus of claim 5, wherein the randomness testing module tests equality of patterns of values output from the PUF hardware.

7. The apparatus of claim 6, wherein the randomness testing module tests the equality based on whether a result of counting each of frequencies of 0 to 15 represented by 4 bits satisfies a second range predetermined on N when N-bit output values output from the PUF hardware are divided by 4 bits, N being a natural number.

8. The apparatus of claim 7, wherein the processing device determines that the PUF hardware is acceptable when a sum of squares of the frequencies of 0 to 15 is within the second range.

9. The apparatus of claim 8, wherein the processing device replaces the sum of the squares with a progression of differences for calculation.

10. The apparatus of claim 9, wherein the randomness testing module adaptively conducts the randomness test on the basis of an interim sum of the poker test.

11. The apparatus of claim 1, wherein the randomness testing module conducts a run test on the PUF hardware.

12. The apparatus of claim 11, wherein the processing device determines that the PUF hardware is acceptable when a changing frequency satisfies a third range predetermined on N, consecutively observing N-bit output values output from the PUF hardware by 1 bit, N being a natural number.

13. The apparatus of claim 12, wherein the randomness testing module receives 0s or 1s from the PUF hardware and tests continuity of the 0s or 1s to conduct the randomness test.

14. The apparatus of claim 13, wherein the third range is determined on a total number of 0s or 1s.

15. The apparatus of claim 1, wherein the randomness testing module conducts a long-run test on the PUF hardware.

16. The apparatus of claim 15, wherein the randomness testing module receives 0s or 1s from the PUF hardware and conducts the randomness test based on whether a bit sequence that is a fourth range or greater is comprised.

17. The apparatus of claim 16, wherein the randomness testing module stops the randomness test when the bit sequence which is the fourth range or greater is comprised.

18. The apparatus of claim 16, wherein the processing device determines that the PUF hardware is defective when the bit sequence which is the fourth range or greater is comprised.

19. A method of testing randomness of a value of physically unclonable function (PUF) hardware comprising:

forming vias or contacts within the PUF hardware, the vias or contacts formed with a size determined to increase a likelihood of short-circuit connections not being formed;

outputting the value from the PUF hardware having a plurality of conductive layers, the value being generated from a determination of whether a short circuit connection exists between conductive layers;

conducting a randomness test on the value; and determining whether the PUF hardware is defective based on an output of the randomness testing module.

20. A computer-readable recording medium recording a program to implement the method of testing randomness of claim 19.

* * * * *